(12) United States Patent
Lamusga et al.

(10) Patent No.: US 10,100,659 B2
(45) Date of Patent: Oct. 16, 2018

(54) HANGER SYSTEM FOR A TURBINE ENGINE COMPONENT

(71) Applicants: Rolls-Royce Corporation, Indianapolis, IN (US); Rolls-Royce North American Technologies, Inc., Indianapolis, IN (US); Rolls-Royce plc, London (GB)

(72) Inventors: Joseph P. Lamusga, Indianapolis, IN (US); Aaron D. Sippel, Zionsville, IN (US); Ted J. Freeman, Danville, IN (US); David J. Thomas, Brownsburg, IN (US); Simon L. Jones, Bristol (GB)

(73) Assignees: Rolls-Royce North American Technologies Inc., Indianapolis, IN (US); Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 153 days.

(21) Appl. No.: 14/968,157

(22) Filed: Dec. 14, 2015

(65) Prior Publication Data

US 2016/0169025 A1     Jun. 16, 2016

Related U.S. Application Data

(60) Provisional application No. 62/092,526, filed on Dec. 16, 2014.

(51) Int. Cl.
*F01D 11/08* (2006.01)
*F01D 25/28* (2006.01)
(Continued)

(52) U.S. Cl.
CPC ............. *F01D 11/08* (2013.01); *F01D 9/04* (2013.01); *F01D 25/246* (2013.01); *F01D 25/28* (2013.01);
(Continued)

(58) Field of Classification Search
CPC . F01D 11/08; F01D 9/04; F01D 9/041; F01D 25/28; F01D 25/246; F05D 2230/60
See application file for complete search history.

(56) References Cited

U.S. PATENT DOCUMENTS 4,222,707 A   9/1980   Drouet et al.
4,759,687 A   7/1988   Miraucourt et al.
(Continued)

FOREIGN PATENT DOCUMENTS

EP   1643084 A1   4/2006
EP   2540994 A1   1/2013
WO   2013163505 A1   10/2013

OTHER PUBLICATIONS

Extended European Search Report, European Application No. 15199748.3-1610, dated Apr. 22, 2016, 11 pages.

(Continued)

*Primary Examiner* — Christopher Verdier
*Assistant Examiner* — Maxime Adjagbe
(74) *Attorney, Agent, or Firm* — Barnes & Thornburg LLP (57) ABSTRACT

A component of a turbine is disclosed. The component includes an carrier segment having a rail, an frame segment including a hanger having a flange supported on the rail of the carrier segment, and an inner surface having a section of a track for a turbine blade defined therein. The component also includes a retainer segment secured to the carrier segment such that the hanger is secured between the retainer segment and the carrier segment.

15 Claims, 9 Drawing Sheets

(51) Int. Cl.
*F01D 9/04* (2006.01)
*F01D 25/24* (2006.01)
*F01D 25/12* (2006.01)

(52) U.S. Cl.
CPC .......... *F01D 25/12* (2013.01); *F05D 2220/30* (2013.01); *F05D 2230/60* (2013.01); *F05D 2240/11* (2013.01); *F05D 2260/201* (2013.01); *F05D 2260/30* (2013.01); *F05D 2300/6033* (2013.01); *Y02T 50/672* (2013.01); *Y02T 50/676* (2013.01)

(56) References Cited

U.S. PATENT DOCUMENTS

| | | | |
|---|---|---|---|
| 5,223,320 A | 6/1993 | Richardson | |
| 5,233,320 A | 8/1993 | Evans | |
| 6,048,170 A | 4/2000 | Dodd | |
| 6,176,676 B1 | 1/2001 | Ikeda et al. | |
| 6,183,199 B1 | 2/2001 | Beeck et al. | |
| 6,243,948 B1 | 6/2001 | Lee et al. | |
| 6,315,519 B1 | 11/2001 | Bagepalli et al. | |
| 6,435,815 B2 | 8/2002 | Harvey et al. | |
| 6,616,406 B2 | 9/2003 | Liang | |
| 6,666,645 B1* | 12/2003 | Arilla | F01D 11/24 415/116 |
| 6,758,653 B2 | 7/2004 | Morrison | |
| 6,932,566 B2 | 8/2005 | Suzumura et al. | |
| 6,994,514 B2 | 2/2006 | Soechting et al. | |
| 7,008,183 B2 | 3/2006 | Sayegh et al. | |
| 7,117,983 B2 | 10/2006 | Good et al. | |
| 7,204,019 B2 | 4/2007 | Ducotey, Jr. et al. | |
| 7,207,771 B2 | 4/2007 | Synnott et al. | |
| 7,334,992 B2 | 2/2008 | Downs et al. | |
| 7,530,789 B1 | 5/2009 | Liang | |
| 7,820,267 B2 | 10/2010 | Fahndrich | |
| 7,997,867 B1 | 8/2011 | Shih et al. | |
| 8,016,564 B1 | 9/2011 | Liang | |
| 8,052,392 B1 | 11/2011 | Liang | |
| 8,070,436 B2 | 12/2011 | Mitchell | |
| 8,079,812 B2 | 12/2011 | Okita | |
| 8,137,055 B2 | 3/2012 | Lang | |
| 8,137,056 B2 | 3/2012 | Fujimoto et al. | |
| 8,153,923 B2 | 4/2012 | Beck et al. | |
| 8,167,537 B1 | 5/2012 | Plank et al. | |
| 8,246,299 B2 | 8/2012 | Razzell et al. | |
| 8,292,584 B2 | 10/2012 | Beck et al. | |
| 8,328,517 B2 | 12/2012 | Liang | |
| 8,360,726 B1 | 1/2013 | Liang | |
| 8,366,395 B1 | 2/2013 | Liang | |
| 2005/0111965 A1* | 5/2005 | Lowe | F01D 9/04 415/116 |
| 2011/0121150 A1* | 5/2011 | Gendraud | F01D 25/246 248/229.23 |
| 2011/0274559 A1 | 11/2011 | Jenne et al. | |
| 2011/0293410 A1 | 12/2011 | Marusko et al. | |
| 2011/0293423 A1 | 12/2011 | Bunker et al. | |
| 2011/0305583 A1 | 12/2011 | Lee et al. | |
| 2012/0027572 A1* | 2/2012 | Denece | F01D 9/04 415/127 |
| 2012/0156029 A1 | 6/2012 | Karafillis et al. | |
| 2012/0237342 A1 | 9/2012 | Berche et al. | |
| 2013/0011248 A1 | 1/2013 | Croteau et al. | |

OTHER PUBLICATIONS

European Office Action, dated Feb. 12, 2018 in connection with European Patent Appln. No. 15199748.3.

European Search Report for EP Application Serial No. 1519974, completed Apr. 22, 2016, (11 pages).

\* cited by examiner

HANGER SYSTEM FOR A TURBINE ENGINE COMPONENT

CROSS REFERENCE TO RELATED APPLICATIONS

This application claims priority to and the benefit of U.S. Provisional Patent Application No. 62/092,526, filed 16 Dec. 2014, the disclosure of which is now expressly incorporated herein by reference.

FIELD OF THE DISCLOSURE

The present disclosure relates generally to gas turbine engines, and more specifically to devices for cooling features of gas turbine engines, including turbine shrouds.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds may be made up of a number of segments arranged circumferentially adjacent to one another to form a ring. Such shrouds sometimes include sealing elements between parts to block air from leaking through the shroud during operation of the gas turbine engine. Thus, more air is forced to pass over the blades included in the rotating wheel assemblies which extract work from the air.

Some shrouds positioned in the turbine may be exposed to high temperatures from products of the combustion reaction in the combustor. Such shrouds sometimes include components made from materials that have different coefficients of thermal expansion. Various gas turbine components, including shrouds, may be cooled using impingement heat transfer, which directs a stream of fluid such as air at a surface of a component to be cooled. Typically, the impingement is achieved by machining impingement holes in a relatively thin plate above the surface or component to be cooled.

SUMMARY

The present disclosure may comprise one or more of the following features and combinations thereof.

According to one aspect of the disclosure, a turbine shroud is disclosed. The turbine shroud comprises a carrier including a plurality of carrier segments arranged about a central axis, and a seal ring (or frame) having a track for a turbine blade defined therein. The seal ring includes a plurality of seal ring segments arranged concentrically with the plurality of carrier segments. Each seal ring segment is formed as one piece from a ceramic matrix composite material and engaged with a corresponding carrier segment at a first point along the central axis. The turbine shroud also includes a retainer secured to the carrier at a second point along the central axis such that the seal ring is secured between the carrier and the retainer.

In some embodiments, a first carrier segment may include a rail extending in a first direction. A first seal ring segment may include a flange extending in a second direction opposite the first direction. The flange may be engaged with the rail of the first carrier segment at the first point. Additionally, in some embodiments, the rail may be one of a number of rails and the flange may be one of a number of flanges. Each rail of the first carrier segment may be engaged with a corresponding flange of the first seal ring segment.

In some embodiments, the first carrier segment may include an wall extending along the central axis from a first end to a second end and a first support wall extending radially inward from the first end of the wall. The first support wall may have one of the rails extending therefrom. A second support wall may extend radially inward from the second end of the wall. The second support wall may have another rail extending therefrom.

In some embodiments, the first seal ring segment may include an arcuate body and a first post extending radially outward from the arcuate body. The first post may have one of the flanges extending therefrom. The first seal ring segment may include a second post extending radially outward from the arcuate body. the second post may have another second flange extending therefrom.

In some embodiments, the second post may be positioned between the second support wall and the retainer. In some embodiments, the retainer may include a first body positioned adjacent the arcuate body of the first seal ring segment, a second body secured to the first carrier segment, and a third body extending between the first body and the second body.

In some embodiments, the first carrier segment may include an lip that extends in the first direction and is received in a slot defined in the second body of the retainer, and a fastener may secure the retainer to the first carrier segment.

In some embodiments, the fastener may be a key received in a keyway defined in the first carrier segment and a groove defined in the second body of the retainer.

In some embodiments, the first carrier segment may include a lip extending in the first direction. The retainer may include a slot that receives the lip of the first carrier segment.

According to another aspect, a component of a turbine is disclosed. The turbine comprises an carrier segment having a rail and an seal ring segment including a hanger having a flange supported on the rail of the carrier segment and an inner surface having a section of a track for a turbine blade defined therein. The component also includes a retainer segment secured to the carrier segment such that the hanger is secured between the retainer segment and the carrier segment.

In some embodiments, the rail of the carrier segment may be a first rail, the hanger of the seal ring segment may be a first hanger, and the retainer segment may be positioned on a first side of the first hanger. In some embodiments, the seal ring segment may include a second hanger that is spaced apart from the first hanger and is positioned on a second side of the first hanger, and the carrier segment may include a second rail that supports a flange of the second hanger.

In some embodiments, the component may also comprise a fastener extending through the retainer segment and a third rail of the carrier segment positioned on the first side of the first hanger. In some embodiments, the third rail may include a lip that is received in a slot defined in the retainer segment, and the fastener may be a key received in a keyway defined in the carrier segment and a groove defined in the retainer segment.

In some embodiments, the rail may extend in a first direction toward the retainer segment. The flange of the hanger may extend in a second direction away from the retainer segment.

In some embodiments, the seal ring segment may be formed as one piece from a ceramic matrix composite material. Additionally, in some embodiments, the seal ring segment may be devoid of fasteners.

In some embodiments, the seal ring segment may include a body, and the hanger may include a post that extends outwardly from the body to an outer tip. The flange may extend from the outer tip of the post.

According to another aspect, a method of assembling a component of a turbine is disclosed. The method comprises advancing an seal ring segment forward to engage a hanger of the seal ring segment with a rail of an carrier segment, positioning a retainer aft the hanger of the seal ring segment, and securing the retainer to the carrier segment such that the hanger is secured between the carrier segment and the retainer. In some embodiments, advancing the seal ring segment forward may include engaging a first hanger of the seal ring segment with a first rail of the carrier segment, and engaging a second hanger of the seal ring segment with a second rail of the carrier segment, the first hanger being positioned forward of the second hanger.

In some embodiments, securing the retainer to the carrier segment may include advancing a fastener radially.

A turbine may include a first frame including a target surface to be cooled, and a second frame coupled to the first frame. The second frame may include a first surface, and a second surface positioned opposite the first surface that is spaced apart from and facing the target surface of the first frame. A first opening is defined in the first surface and a first inner wall extends inwardly from the first opening to define a first passageway having a first diameter, and a second opening is defined in the second surface and a second inner wall extends inwardly from the second opening to an surface. The surface and the second inner wall defining a second passageway that is connected to the first passageway and has a second diameter that is greater than the first diameter. The turbine may also include a source of positive pressure to move air into the first passageway, through the second passageway, and into contact with the target surface. The second passageway has a length that is defined between the second opening and the surface. The length may be defined by the following equation:

$$L = R^{*}(D_2 - D_1)$$

where L is the length defined between the second opening and the surface, R is a coefficient greater than or equal to 4.0, $D_1$ is the first diameter, and $D_2$ is the second diameter.

In some embodiments, the second frame may be one segment of a plurality of segments of an carrier. In some embodiments, the first frame may be one segment of a plurality of segments that define a turbine blade track. Additionally, in some embodiments, each segment of the first frame may be formed from a ceramic matrix composite material.

In some embodiments, the target surface of the first frame may be substantially smooth.

In some embodiments, the second diameter may be equal to about 0.090 inches. Additionally, in some embodiments, the first diameter may be equal to about 0.028 inches. In some embodiments, the length of the second passageway may be greater than 0.190 inches.

In some embodiments, the first passageway and the second passageway may share a longitudinal axis. In some embodiments, an imaginary line may extend along the longitudinal axis of the first passageway and the second passageway. The imaginary line may have a line length that is defined between the second opening of the first frame and the target surface. The line length may be defined by the following equation:

$$1.0 < \frac{z}{D_z} < 4.8$$

where z is the line length and $D_2$ is the second diameter.

According to another aspect, a turbine may include a frame and a carrier positioned radially outward from the frame. The frame includes an inner surface having a track for a turbine blade defined therein and a substantially smooth target surface positioned opposite the inner surface of the frame. The carrier includes an impingement hole that extends through an outer surface of the carrier and an inner surface positioned opposite the outer surface. The inner surface of the carrier is spaced apart from and facing the target surface of the frame. The turbine may also include a source of positive pressure to move air through the impingement hole into contact with the target surface of the frame. The impingement hole may include an outer opening defined in the outer surface and a first inner wall extending inwardly from the outer opening to define a first passageway having a first diameter, and an inner opening defined in the inner surface and a second inner wall extending inwardly from the inner opening to define a second passageway that is connected to the first passageway and has a second diameter that is greater than the first diameter.

In some embodiments, the outer opening may have a first diameter and the inner opening may have a second diameter. The second passageway may have a length that is greater than the first diameter or the second diameter to ensure that air completely fills the outer opening when air is moved through the impingement hole.

In some embodiments, the second passageway may have a longitudinal axis, and an imaginary line may extend along the longitudinal axis and has a line length that is defined between the inner opening of the carrier and the target surface, the line length being defined by the following equation:

$$1.0 < \frac{z}{D_z} < 4.8$$

where z is the line length and $D_2$ is the second diameter.

In some embodiments, the second passageway may have a length that is defined between the inner opening and an surface. The length may be defined by the following equation $$L = R^{*}(D_2 - D_1)$$

L is the length defined between the second opening and the surface, R is a coefficient greater than or equal to 4.0, $D_1$ is the first diameter, and $D_2$ is the second diameter.

In some embodiments, the impingement hole may be a plurality of impingement holes defined in the carrier. In some embodiments, the frame may include a plurality of frame segments. Each segment may be formed as one piece from a ceramic matrix composite material.

In some embodiments, the carrier may include a plurality of carrier segments, and each carrier segment may include at least one impingement hole. The plurality of frame segments may be arranged concentric with the plurality of carrier segments. In some embodiments, one segment of the frame may be secured to one carrier segment.

According to another aspect, a component of a turbine may include an frame segment and an carrier segment coupled to the frame segment. The frame segment includes an inner surface having a section of a track for a turbine blade defined therein and a substantially smooth target surface positioned opposite the inner surface of the frame segment. The carrier segment includes an impingement hole that extends through an outer surface of the carrier segment and an inner surface positioned opposite the outer surface. The inner surface of the carrier segment is spaced apart from and facing the target surface of the frame segment. The impingement hole includes an outer opening defined in the outer surface and a first inner wall extending inwardly from the outer opening to define a first passageway having a first diameter, and an inner opening defined in the inner surface and a second inner wall extending inwardly from the inner opening to an surface. The surface and the second inner wall defines a second passageway that is connected to the first passageway and has a second diameter that is greater than the first diameter.

In some embodiments, the turbine component may include an carrier that includes the carrier segment, and a plurality of frame segments that include the frame segment. The plurality of frame segments may be arranged concentric with the carrier and may define the track for the turbine blade.

In some embodiments, the second passageway may have a longitudinal axis, and an imaginary line may extend along the longitudinal axis and have a line length that is defined between the inner opening of the carrier segment and the target surface. The line length may be defined by the following equation:

$$1.0 < \frac{z}{D_z} < 4.8$$

where z is the line length and $D_2$ is the second diameter.

In some embodiments, the second passageway may have a length that is defined between the inner opening and an surface. The length may be defined by the following equation:

$$L = R*(D_2 - D_1)$$

L is the length defined between the second opening and the surface, R is a coefficient greater than or equal to 4.0, $D_1$ is the first diameter, and $D_2$ is the second diameter.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
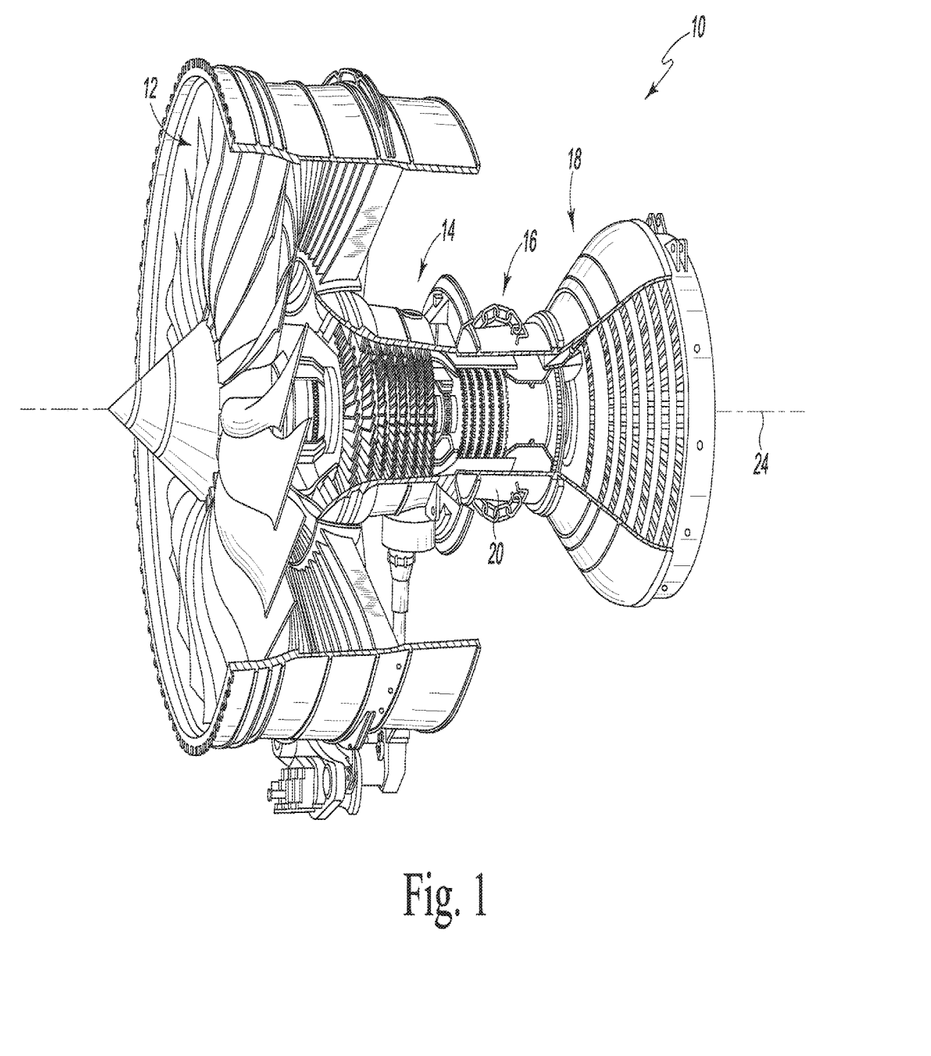
FIG. 1 is a cut-away perspective view of a gas turbine engine including a turbine section.

FIG. 1 shows an illustrative aerospace gas turbine engine 10. The engine 10 includes a fan 12, a compressor 14, a combustor 16, and a turbine 18 that are mounted in a case 20. The fan 12 is driven by the turbine 18 and provides thrust for propelling an air vehicle (not shown). The compressor 14 is configured to compress and to deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the fan 12.

Figure 2:
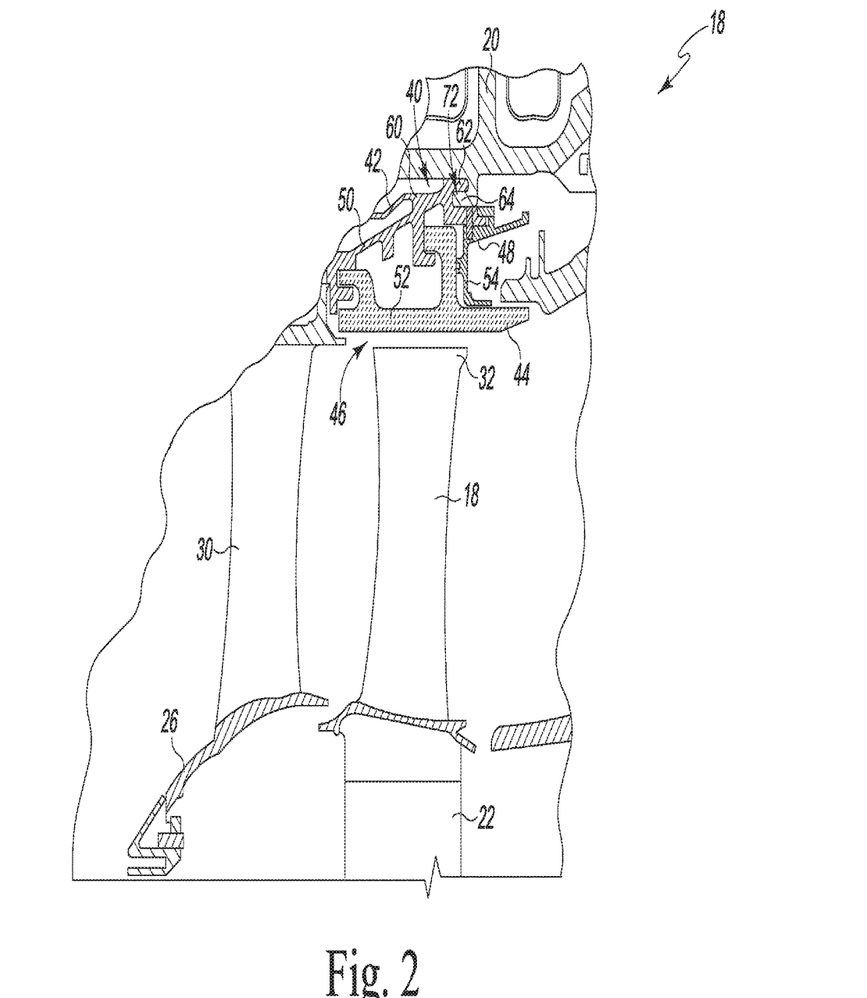
FIG. 2 is a partial cross-sectional view of the gas turbine engine of FIG. 1 showing a turbine shroud.

Referring now to FIG. 2, the turbine 18 includes a turbine wheel assembly 22 that is configured to rotate about a central axis 24 (see FIG. 1) of the turbine 18 and a number of static vane assemblies 26. The turbine wheel assembly 22 includes a hub (not shown) and a plurality of blades 28 that extend radially outward from the hub. Each vane assembly 26 includes a plurality of vanes 30 that extend across the flow path of the hot, high-pressure combustion products from the combustor 16. Each vane 30 is stationary and is configured to direct combustion products toward one or more of the blades 28 during operation. The combustion products push the blades 28, thereby causing the turbine wheel assembly 22 to rotate and drive the rotating components of the compressor 14 and the fan 12.

The turbine 18 also includes a turbine shroud 40 that extends around the turbine wheel assembly 22 to block combustion products from passing over the blades 28 without causing the blades 28 to rotate. To cool the shroud, which is heated by its exposure to those high temperature combustion products, the shroud 40 includes a plurality of through-holes 120 (see FIGS. 6-8), which provide pathways for a cooling fluid such as air to move through the various components of the shroud 40. In the illustrative embodiment, the through-holes (hereinafter called impingement holes) direct the air at a surface or components to be cooled, as described in greater detail below.

The turbine shroud 40 of the engine 10 includes an outer support carrier or frame 42 that is coupled to the case 20 and extends radially inward from the case 20 toward the turbine wheel assembly 22. An inner support frame 44 (sometimes called a seal ring or blade track or seal segment) is positioned between the outer support frame 42 and the turbine wheel assembly 22. The inner support frame 44 has a blade track 46 defined therein, which receives the tips 32 of the blades 28 such that the blades 28 run along the blade track 46 when pushed by the combustion products. In the illustrative embodiment, the turbine shroud 40 includes an axial retainer 48 that couples the inner support frame 44 to the outer support frame 42, thereby securing the inner support frame 44 to the case 20.

Figure 3:
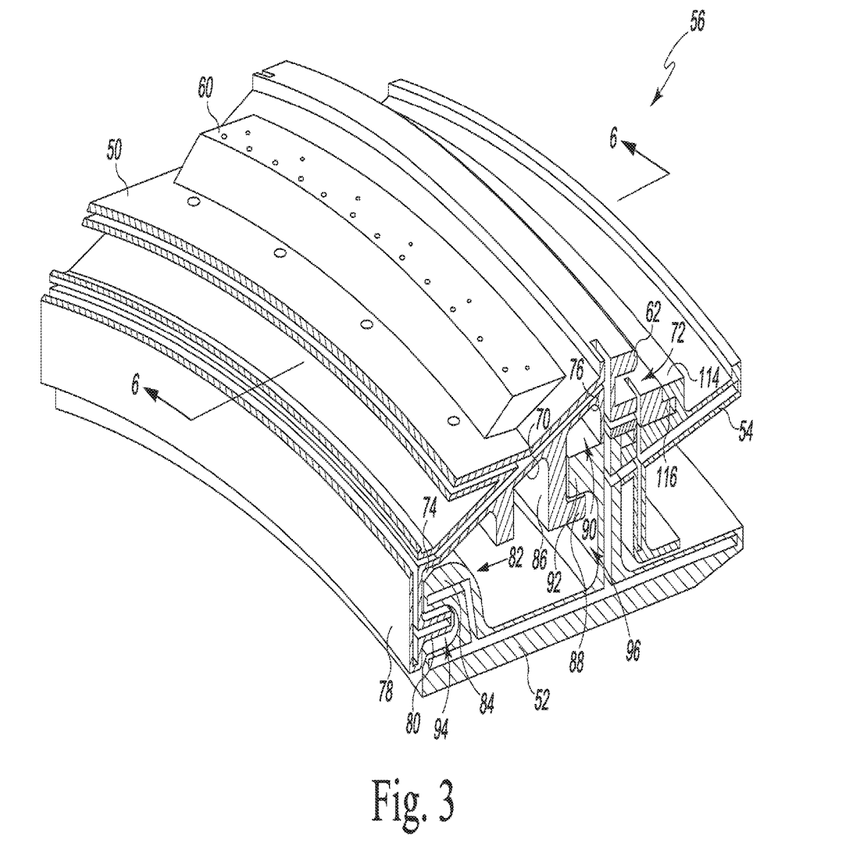
FIG. 3 is a front perspective view of a shroud segment including carrier segment and a frame segment of the turbine shroud of FIG. 2.

In the illustrative embodiment, each of the frames 42, 44 include a plurality of segments 50, 52, respectively, which are arranged to form annular structures. Similarly, the axial retainer 48 includes a plurality of retainer segments 54, which correspond to the segments 50, 52. Each retainer segment 54 secures one carrier segment 50 to one seal segment 52 to form a shroud segment 56, as shown in FIG. 3. In the illustrative embodiment, the turbine shroud 40 is formed from a plurality of shroud segments 56 are secured to the casing 20 and arranged about the central axis 24 to form the turbine shroud 40. In that way, the turbine shroud 40 is formed from a plurality of shroud segments 56. The turbine shroud 40 is illustratively formed from twenty shroud segments 56 (i.e., twenty carrier segments 50, twenty seal segments 52, and twenty retainer segments 54), which are arranged about the central axis 24 in an annular or ring shape that includes an opening sized to receive a turbine wheel assembly 22. It should be appreciated that in other embodiments the frames 42, 44 and retainer 48 may be formed as monolithic components rather than from more than one segment.

The carrier segments 50 and the retainer segments 54 are formed from metallic materials such as, for example, nickel-based alloys. It should be appreciated that in other embodiments the segments 50, 54 may be formed from non-metallic or composite materials. Additionally, in the illustrative embodiment, each inner frame or seal segment 52 is formed from a ceramic material, such as, for example, ceramic matrix composite or CMC. As used herein, a "ceramic" material is any monolithic ceramic or a composite in which at least one constituent is a ceramic. In other embodiments, the each seal segment 52 may be made of other metallic, non-metallic, or composite materials.

Each carrier segment 50 includes a carrier shell 60 configured to be coupled to the case 20. In the illustrative embodiment, the shell 60 includes a rear mounting flange 62 configured to engage a corresponding aft flange 64 (see FIG. 2) of the case 20. As shown in FIG. 2, the aft flange 64 of the case 20 is received in a slot 72 defined in the rear mounting flange 62 of the shell 60. It should be appreciated that in other embodiments various other arrangements of slots, flanges, fasteners, retainers, etc. may be used to secure each carrier segment 50 (and hence the shroud segment 56) to the case 20.

As described above, a seal segment 52 is coupled to a corresponding carrier segment 50 via a retainer segment 54. Returning to FIG. 3, the shell 60 of the carrier segment 50 has an annular wall 70 that extends from a forward end 74 to a back end 76 positioned forward of the mounting flange 62. A support wall 78 extends radially inward from the forward end 74 of the annular wall 70. The carrier segment 50 also includes a rail 80 that extends rearwardly away from the support wall 78 to define a forward slot 82 between the rail 80 and the annular wall 70. In that way, the carrier segment 50 is configured to be engaged with the segment 52 at a first point along the central axis 24. As described in greater detail below, the forward slot 82 receives a fore flange 84 of the seal segment 52 and the rail 80 of the carrier segment 50 is received in a corresponding slot 94 defined in the seal segment 52.

The carrier segment 50 also includes a rear support wall 86 that extends radially inward from the back end 76 of the annular wall 70. Another rail 88 extends away from the rear support wall 86 toward the rear of the carrier segment 50. In the illustrative embodiment, a slot 90 is defined between the rear mounting flange 62 of the carrier segment 50 and the rail 88 of the carrier segment 50. The slot 90 receives an aft flange 92 of the seal segment 52, and the rail 88 of the carrier segment 50 is received in a corresponding slot 96 defined in the seal segment 52, as described in greater detail below.

Figure 5:
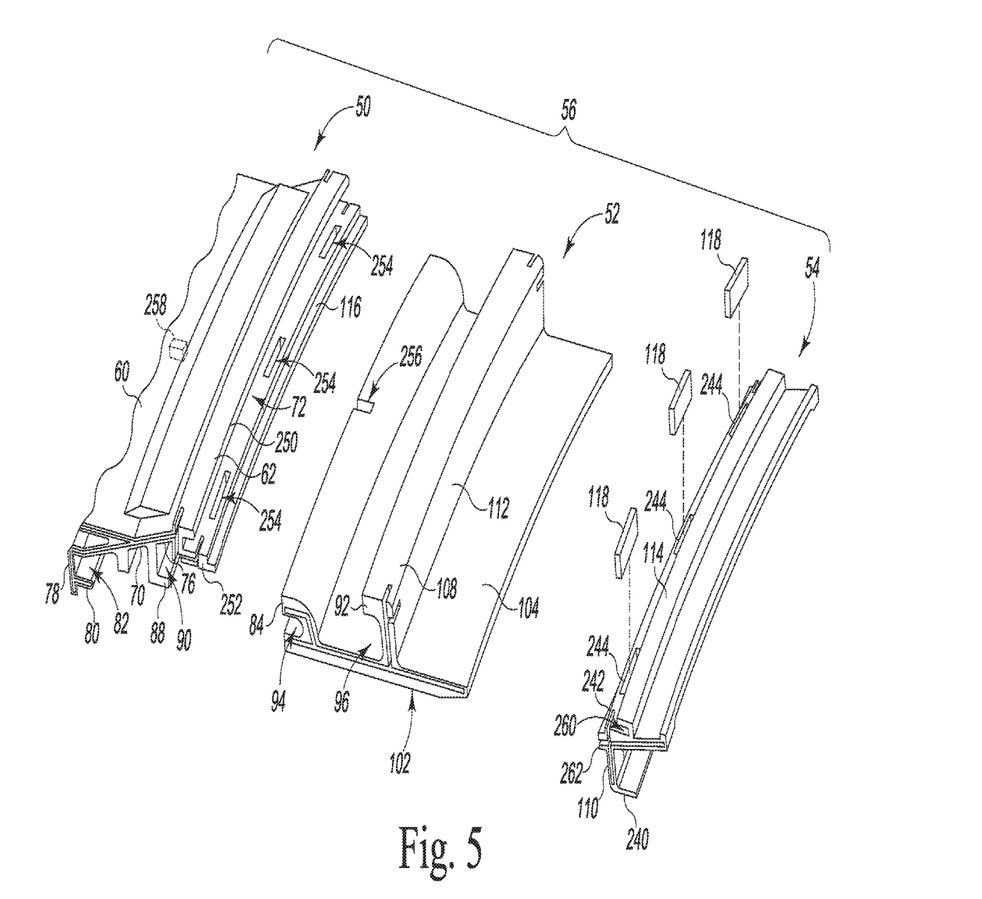
FIG. 5 is an exploded view of the shroud segment of FIGS. 3-4.

Referring now to FIG. 5, each seal segment 52 of the inner support frame 44 includes an arcuate body 100 that has a radially inward surface 102 and a radially outward surface 104. The radially inward surface 102 defines a section of the blade track 46 and is configured to be positioned adjacent to the tips 32 of the blades 28 when the turbine 18 is assembled. The seal segment 52 also includes a pair of hangers 106, 108, which extend outward from the radially outward surface 104. The hanger 106 includes the fore flange 84 of the seal segment 52, while the hanger 108 includes the aft flange 88. The slot 94, which, as described above, is sized to receive the rail 80 of the carrier segment 50, is defined between the fore flange 84 and the radially outward surface 104. The other slot 96, which, as described above, is sized to receive the rail 88 of the carrier segment, is defined between the aft flange 92 and the radially outward surface 104.

As shown in FIG. 5, the retainer segment 54 includes a body 110 that engages the rear surface 112 of the rear hanger 108 of the seal segment 52 and is spaced apart from the radially outward surface 104 of the seal segment 52. The retainer segment 54 also includes a flange 114 that extends from the body 110 to engage a lip 116 of the rear mounting flange 64 of the carrier segment 50. A plurality of fasteners 118 secure the retainer segment 54 to the carrier segment 50, as described in greater detail below. In that way, the carrier segment 50 is configured to be engaged with the segment 54 at a second point along the central axis 24. The engagement of the retainer segment 54 with the seal segment 52 and the carrier segment 50 secures the segments 50, 52 together to form a shroud segment 56.

Figure 6:
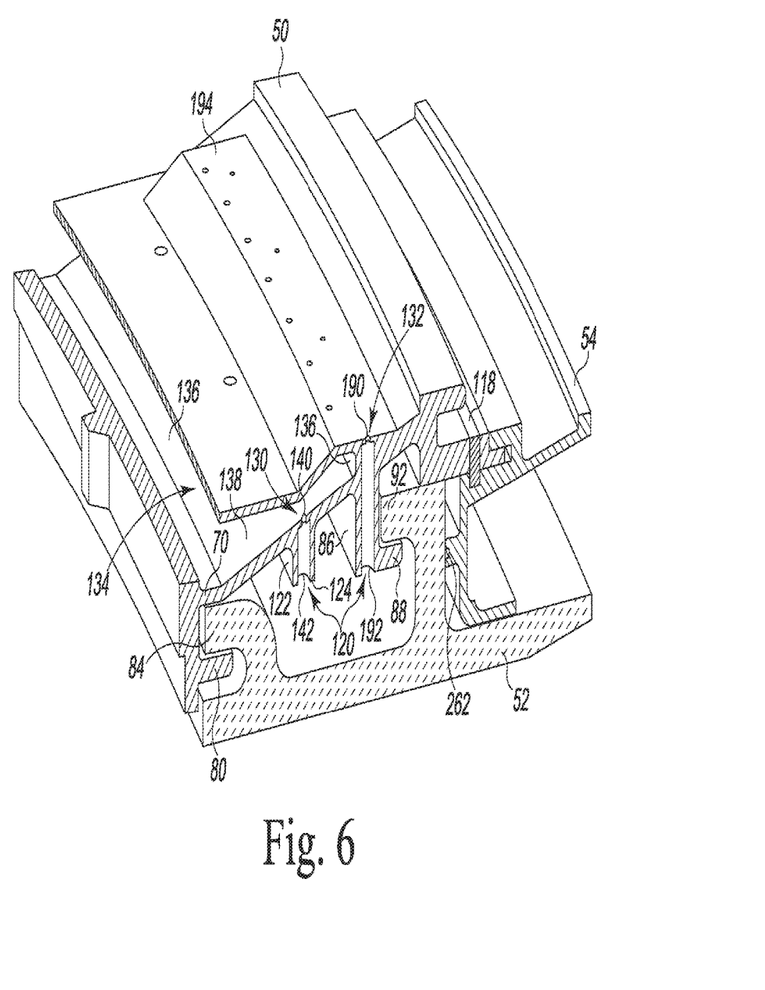
FIG. 6 is a perspective cross-sectional view of the assembly taken along the line 6-6 in FIG. 3.

As described above, the turbine shroud 40 extends around the turbine wheel assembly 22 to block combustion products from passing over the blades 28. To cool the shroud, which is heated by its exposure to those high temperature combustion products, each shroud segment 56 includes one or more impingement holes 120, as shown in FIG. 6, which direct air at a target. In the illustrative embodiment, each impingement hole 120 is defined in a carrier segment 50 of each shroud segment 56. As described in greater detail below, one target to be cooled using the impingement holes 120 is the arcuate body 100 of the seal segment 52.

As shown in FIG. 6, the carrier segment 50 includes an annular rib 122 that extends from the annular wall 70. The rib 122 extends radially inward from the annular wall 70 to an inner surface 124 that faces, but is spaced apart from, the radially outward surface 104 of the seal segment 52. In the illustrative embodiment, the impingement holes 120 include a set of impingement holes 130 that extend through the annular rib 122 and another set of impingement holes 132 that extend through the rear support wall 86 of the carrier segment 50.

Each impingement hole 130 is connected to a cavity 134 that is defined in the carrier segment 50. The cavity 134 extends circumferentially along the shell 60 and is defined between a number of surfaces 136. The surfaces 136 include an outer surface 138 that faces radially outward, away from the arcuate body 100 of the seal segment 52. As shown in FIG. 6, each impingement hole 130 extends from an opening 140 defined in the outer surface 138 to an opening 142 defined in the inner surface 124 of the annular rib 122. In the illustrative embodiment, the impingement holes 130 are arranged circumferentially along the rib 122.

Figure 7:
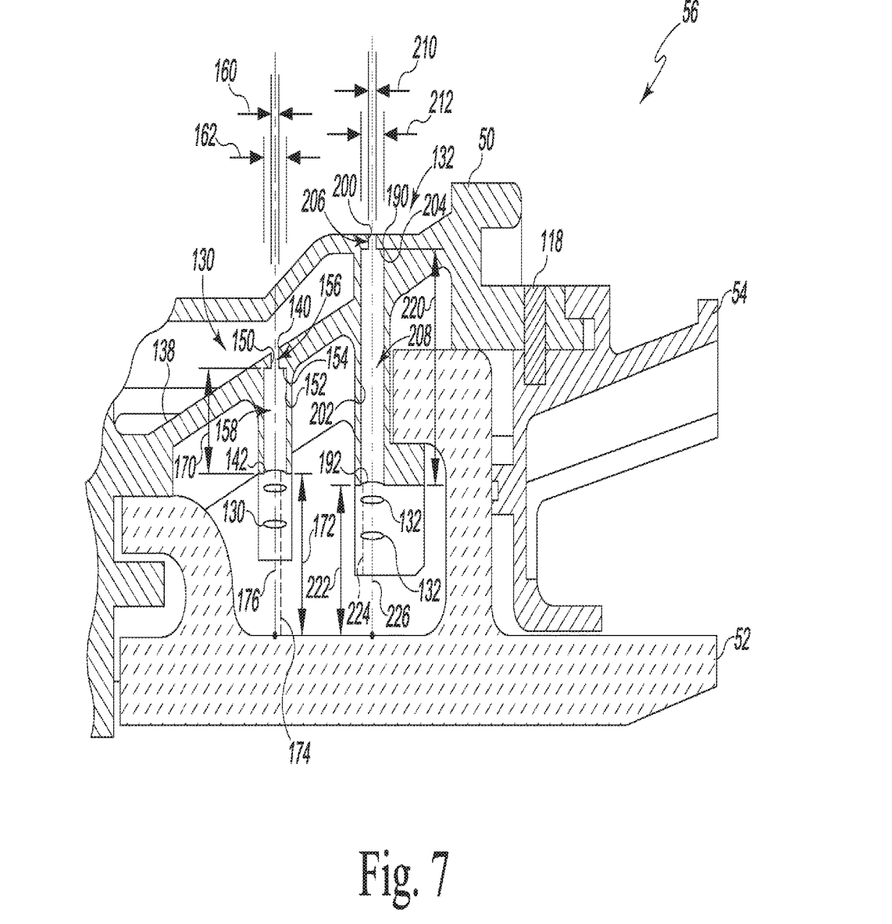
FIG. 7 is a cross-sectional elevation view of the assembly taken along the line 6-6 in FIG. 3.

As shown in FIG. 7, each impingement hole 130 is defined by an inner wall 150 that extends inwardly from the opening 140 and another inner wall 152 that extends inwardly from the opening 142 to an annular surface 154. The inner wall 150 defines a passageway 156 that extends from the opening 140 through the annular surface 154. The inner wall 152 defines another passageway 158, which is positioned radially inward from the passageway 156 and extends from the opening 142 to the annular surface 154. In that way, the passageways 156, 158 are connected together such that fluid entering the opening 140 may advance along the passageway 156, into the passageway 158, and out the opening 142.

In the illustrative embodiment, the opening 140 is circular and has a diameter 160; similarly, the other opening 142 is circular and has a diameter 162 that is greater than the diameter 160. The passageways 156, 158 are substantially cylindrical, and, as shown in FIG. 7, the diameters of the passageways 156, 158 match the diameters 160, 162, respectively, of the openings 140, 142. The diameter 160 is equal to about 0.030 inches. In other embodiments, the diameter 160 may be between 0.015 and 0.060 inches. The diameter 160 is dependent on the air flow rate required to achieve the necessary heat transfer to cool the target component of the impingement hole. The diameter 160 will depend on a number of other factors, such as, for example, the total number of impingement holes.

The diameter 162 of each hole 130 is equal to about 0.090 inches. In other embodiments, the diameter 162 may be between 0.050 and 0.150 inches. It should be appreciated that in other embodiments the openings and the passageways may take other geometric shapes.

As shown in FIG. 7, the passageway 158 of the impingement hole 130 has a length 170 defined between the opening 142 and the annular surface 154. In the illustrative embodiment, the length 170 is greater than 0.240 inches. In the illustrative embodiment, the length 170 is calculated to ensure that air flowing through the impingement hole 130 fills the opening 142 when the air passes therethrough. In one embodiment, the minimum length 170 may be determined using the following equation:

$$L = R^*(D_2 - D_1) \tag{1}$$

where L is the length 170 defined between the opening 142 and the annular surface 154, $D_1$ is the diameter 160, and $D_2$ is the diameter 162. The term "R" is an empirically-derived coefficient that is greater than or equal to 4.0.

As described above, the impingement holes 130 are configured to direct air toward the arcuate body 100 of the seal segment 52. As shown in FIG. 7, the impingement hole 130 is offset from the radially outward surface 104 of the seal segment 52 by a distance 172. In the illustrative embodiment, the distance 172 is about 0.425 inches. In one embodiment, the distance 172 may be determined using the following equation:

$$1.0 < \frac{z}{D_z} < 4.8 \tag{2}$$

where z is the distance 172 and $D_2$ is the diameter 162 of the opening 142. In other embodiments, the distance 172 may be between 0.250 and 0.750 inches.

As shown in FIG. 7, the distance 172 is defined along an imaginary line segment 174, which extends along or parallel to the longitudinal axis 176 of the impingement hole 130. In the illustrative embodiment, the passageways 156, 158 share a common longitudinal axis 176. In other embodiments, the passageways 156, 158 may be offset such that their axes are not coincident.

Returning to FIG. 6, the carrier segment 50 also includes another set of impingement holes 132 that extend through the rear support wall 86. In the illustrative embodiment, each impingement hole 132 extends parallel to a corresponding impingement hole 130. Each impingement hole 132 extends from an opening 190 defined in the outer radially surface 194 of the carrier segment 50 to an opening 192 defined in an inner surface 196 of the rear support wall 86. In the illustrative embodiment, the impingement holes 132 are arranged circumferentially along the support wall 86.

As shown in FIG. 7, each impingement hole 132 is defined by an inner wall 200 that extends inwardly from the opening 190 and another inner wall 202 that extends inwardly from the opening 192 to an annular surface 204. The inner wall 200 defines a passageway 206 that extends from the opening 190 through the annular surface 204. The inner wall 202 defines another passageway 208, which is positioned radially inward from the passageway 206 and extends from the opening 192 to the annular surface 204. In that way, the passageways 206, 208 are connected together such that fluid entering the opening 190 may advance along the passageway 206, into the passageway 208, and out the opening 192.

In the illustrative embodiment, the opening 190 is circular and has a diameter 210; similarly, the other opening 192 is circular and has a diameter 212 that is greater than the diameter 210. The passageways 206, 208 are substantially cylindrical, and, as shown in FIG. 7, the diameters of the passageways 206, 208 match the diameters 210, 212, respectively, of the openings 190, 192. The diameter 210 is equal to about 0.028 inches. The diameter 210, like the diameter 160, is dependent on the air flow rate required to achieve the necessary heat transfer to cool the target component of the impingement hole. The diameter 210 will also depend on other factors, including, for example, the total number of impingement holes. In other embodiments, the diameter 210 may be between 0.015 and 0.060 inches, The diameter 212 of each hole 132 is equal to about 0.090 inches. In other embodiments, the diameter 212 may be between 0.050 and 0.150 inches. It should be appreciated that in other embodiments the openings and the passageways may take other geometric shapes.

The passageway 208 of the impingement hole 132 has a length 220 defined between the opening 192 and the annular surface 204. In the illustrative embodiment, the length 220 is greater than 0.248 inches. In the illustrative embodiment, the length 220 is calculated to ensure that air flowing through the impingement hole 132 fills the opening 192 when the air passes therethrough. In one embodiment, the minimum length 220, like the length 170, may be determined using Equation (1) set forth above.

As shown in FIG. 7, the impingement hole 132 is offset from the radially outward surface 104 of the seal segment 52 by a distance 222. In the illustrative embodiment, the distance 222 is about 0.410 inches. In one embodiment, the distance 222, like the distance 172, may be determined using Equation (2) set forth above. The distance 222 is defined along an imaginary line segment 224, which extends along or parallel to the longitudinal axis 226 of the impingement hole 132. In other embodiments, the distance 222 may be between 0.250 and 0.750 inches.

Figure 8:
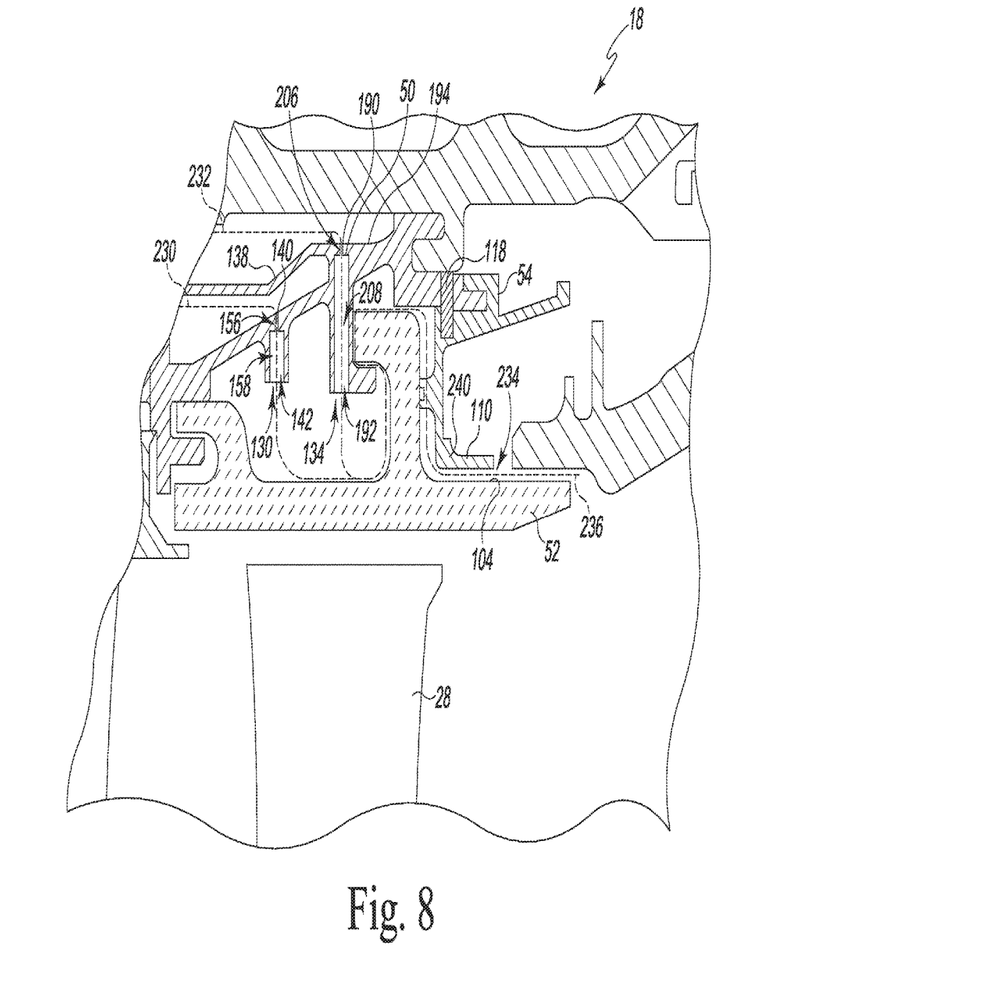
FIG. 8 is a partial cross-sectional elevation view similar to FIG. 2.

In use, the compressor 14 of the turbine 18 act as a source of positive pressure to move air through the impingement holes 120 and cool the seal segments 52 and hence the inner support frame 44. As shown in FIG. 8, air, which is indicated by dashed lines 230, 232, is moved from around the combustor 16 and outside of the case 20 and advanced through conduits (not shown) defined in the shell 60 of each carrier segment 50. In the illustrative embodiment, the flow rate of the air is about 0.054 lbm/s per seal segment 52 or 0.0045 lbm/s per impingement hole 120. The air is moved into the cavity 134 of the carrier segment and advanced into the opening 140 defined in the outer surface 138. The turbine 18 then draws the air radially inward along the passageway 156 and into the passageway 158. The length 170 of the passageway 158 permits the stream of air, which was narrowed and accelerated in passageway 156, to expand and fill the passageway 158 prior to exiting the opening 142 of the impingement hole 130.

The air exiting the opening 142 is directed at the arcuate body 100 of the seal segment 52, as indicated by line 230. The air that contacts the arcuate body 100 cools the seal segment 52 via impingement heat transfer. As shown in FIG. 8, the air is then moved through various openings and conduits (not shown) in the carrier segment 50 and retainer segment 54.

As indicated by line 232, air is also advanced into the opening 190 of each impingement hole 132 defined in the outer surface 194 of the carrier segment 50. The turbine 18 then draws the air radially inward along the passageway 206 and into the passageway 208. The length 220 of the passageway 208 permits the stream of air, which was narrowed and accelerated in passageway 206, to expand and fill the passageway 208 prior to exiting the opening 192 of the impingement hole 132. The air exiting the opening 192 is directed at the arcuate body 100 of the seal segment 52, thereby cooling the seal segment 52 via impingement heat transfer.

As shown in FIG. 8, the air is then moved through various openings and conduits (not shown) in the carrier segment 50. Air is advanced outward through a passageway 234 defined between a lower strut 240 of the retainer segment body 110 and the radially outward surface 104 of the seal segment 52, as indicated by dashed line 236. The passageway 234 is configured to direct the cooling air over the aft overhang of the seal segment 52 to cool that section of the segment 50.

Returning to FIGS. 4-5, the seal segment 52 is secured to the carrier segment 50 via the retainer segment 54, as described above. As a result, the seal segment 52 is devoid of openings or passageways for fasteners and is formed as a single, monolithic component. In the illustrative embodiment, each retainer segment 54 is secured to each carrier segment 50 via a plurality of fasteners 118. In the illustrative embodiment, each fastener 118 is a rectangular key. The fasteners 118 are illustratively formed from a metallic material such as, for example, a nickel-based alloy. In other embodiments, the fasteners 118 may be formed from non-metallic or composite materials.

As shown in FIG. 5, each fastener 118 is configured to be received in an upper strut 242 of the retainer segment body 110, which is positioned opposite the lower strut 240. A plurality of grooves 244 are defined in an upper surface 246 of the upper strut 242, and each groove 244 is sized to receive a one of the fasteners 118. A bottom surface (not shown) closes the bottom of each groove 244 to retain the fastener 118 therein. In other embodiments, the grooves 244 may be formed with an open bottom. In the illustrative embodiment, each groove 244 has a substantially rectangular cross-section to match the configuration of the fastener 118. It should be appreciated that in other embodiments the fasteners 118 may be formed as other geometric shapes. In such embodiments, each groove is shaped to receive the geometric shape of the fastener.

As described above, each carrier segment 50 includes a flange 62 that engages the casing 20. The flange 62 includes an upper rail 250 that is positioned opposite a lower rail 252. The slot 72, which receives the aft flange 64 of the casing 20, is defined between the rails 250, 252. As shown in FIG. 5, the lower rail 252 has a plurality of keyways 254 defined therein, and each keyway 254 is sized to permit the passage of one of the fasteners 118. When the retainer segment 54 is attached to the carrier segment 50, the keyways 254 of the carrier segment 50 are aligned with the grooves 244 of the retainer segment 54 and the fasteners 118 engages the segments 50, 54 from above, as described in greater detail below. In the illustrative embodiment, each keyway 254 has a substantially rectangular cross-section to match the configuration of the fastener 118. It should be appreciated that in other embodiments the fasteners 118 may be formed as other geometric shapes. In such embodiments, each keyway is shaped to receive the geometric shape of the fastener. It should also be appreciated that in other embodiments the keyways may be formed in the retainer segment and the grooves may be formed in the carrier segment 50 such that the fasteners 118 engage the segments 50, 54 from below.

To assemble a shroud segment 56, a seal segment 52 is aligned with a corresponding carrier segment 50. The seal segment 52 may then be advance forward such that the flanges 84, 92 of the hangers 106, 108 are received in the slots 82, 90, respectively, of the carrier segment 50. When the seal segment 52 is properly positioned, the rails 80, 88 of the carrier segment 50 are also received in slots 94, 96 defined in the seal segment 52. As shown in FIG. 5, the seal segment 52 also includes a notch 256 that is defined in the flange 84 of the hanger 106. The notch 256 is sized to receive an alignment pin 258 extending from the support wall 78 of the carrier segment 50. In the illustrative embodiment, the notch 256 and pin 258 act as an anti-rotation feature to prevent the seal segment 52 from rotating relative to the carrier segment 50. It should be appreciated that in other embodiments each of the segments 50, 52 may include other anti-rotation features.

Figure 4:
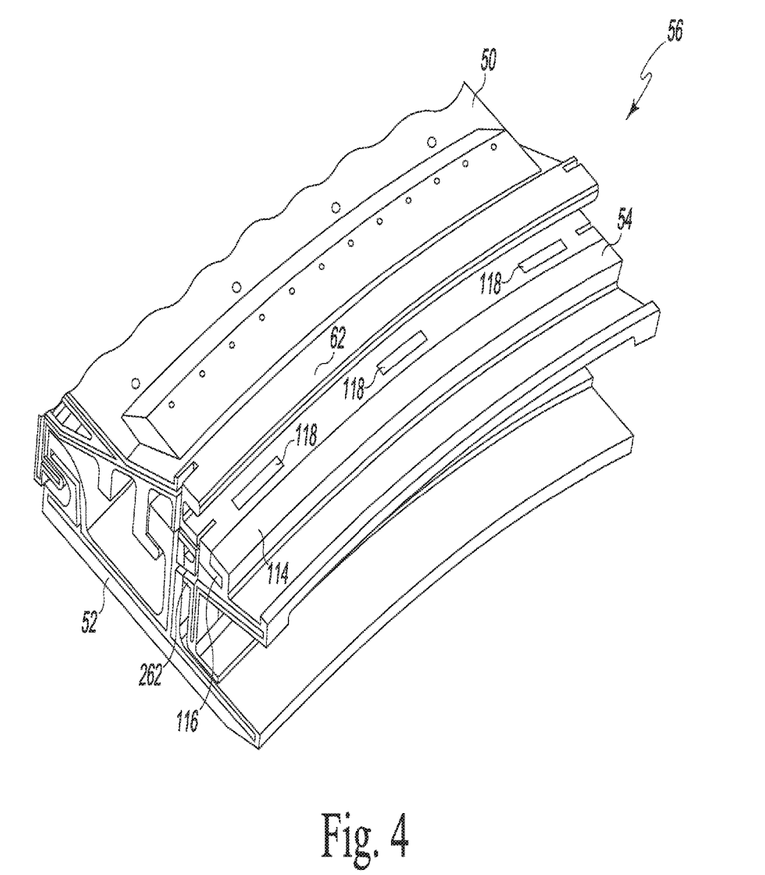
FIG. 4 is a rear perspective view of the shroud segment of FIG. 3.

The retainer segment 54 may be aligned axially with the segments 50, 52 and advanced toward the rear of the carrier segment 50. As the retainer segment 54 is moved forward, the flange 114 of the retainer segment 54 is advanced over the rear lip 116 of the carrier segment 50 and the lip 116 is positioned in a channel 260 defined in the retainer segment 54, as shown in FIGS. 3-4. The retainer segment 54 may be advanced forward until a beam 262 of the retainer body 110 engages the rear surface 112 of the seal segment 52. In that position, the grooves 244 defined in the retainer segment 54 are aligned with, and positioned below, the keyways 254 of the carrier segment 50.

The fasteners or keys 118 may then be advanced into the keyways 254 and grooves 244, thereby securing the retainer segment 54 to the carrier segment 50 and forming the shroud segment 56. In that way, the carrier segment 50 and the retainer segment 54 cooperate to prevent the seal segment 52 from translating axially when assembled in the turbine 10. Additionally, the engagement between the retainer body 110 and the seal segment 52 permits the retainer segment 54 to act as a backstop to counter bending loads directed at the rear hanger 108 of the seal segment 52.

The shroud segment 56 may then be attached to the casing 20 with other shroud segments 56 to form the turbine shroud 40. It should be appreciated that each carrier segment 50 may be attached the casing 20 before the other segments 52, 54 are attached. It should also be appreciated that the shroud segments 56 may be assembled to form the turbine shroud 40 before any of the segments 56 are attached to the casing 20.

Referring now FIG. 9, another embodiment of a shroud segment (hereinafter shroud segment 356) is shown. The embodiment of FIG. 9 includes many features that are similar to the embodiment of FIGS. 2-8. Such features will be identified with the same reference numbers in FIG. 9. In the illustrative embodiment, the shroud segment 356 includes a seal segment 52 that is identical to the seal segment 52 of the shroud segment 56 described above. The shroud segment 356 also includes a carrier segment 350 and a retainer segment 354 that is secured to the carrier segment 350 via a plurality of fasteners 418.

The carrier segment 350 includes a carrier shell 360 configured to be coupled to the case 20. Similar to the embodiment of FIGS. 2-8, the shell 360 includes a rear mounting flange 62 configured to engage a corresponding aft flange 64 (see FIG. 2) of the case 20. The flange 62 includes an upper rail 250 that is positioned opposite a lower rail 452. The slot 72, which receives the aft flange 64 of the casing 20, is defined between the rails 250, 452.

The shell 360 also has an annular wall 70 that extends from a forward end 74 to a back end 76 positioned forward of the mounting flange 62. A support wall 78 extends radially inward from the forward end 74 of the annular wall 70. The carrier segment 350 also includes a rail 80 that extends rearwardly away from the support wall 78 to define a forward slot 82 between the rail 80 and the annular wall 70 that receives a fore flange 84 of the seal segment 52 in a manner similar to that described above.

The carrier segment 350 also includes a rear support wall 86 that extends radially inward from the back end 76 of the annular wall 70. Another rail 88 extends away from the rear support wall 86 toward the rear of the carrier segment 350. In the illustrative embodiment, a slot 90 is defined between the rear mounting flange 62 of the carrier segment 350 and the rail 88 of the carrier segment 350. The slot 90 receives the aft flange 92 of the seal segment 52 in a manner similar to that described above.

Figure 9:
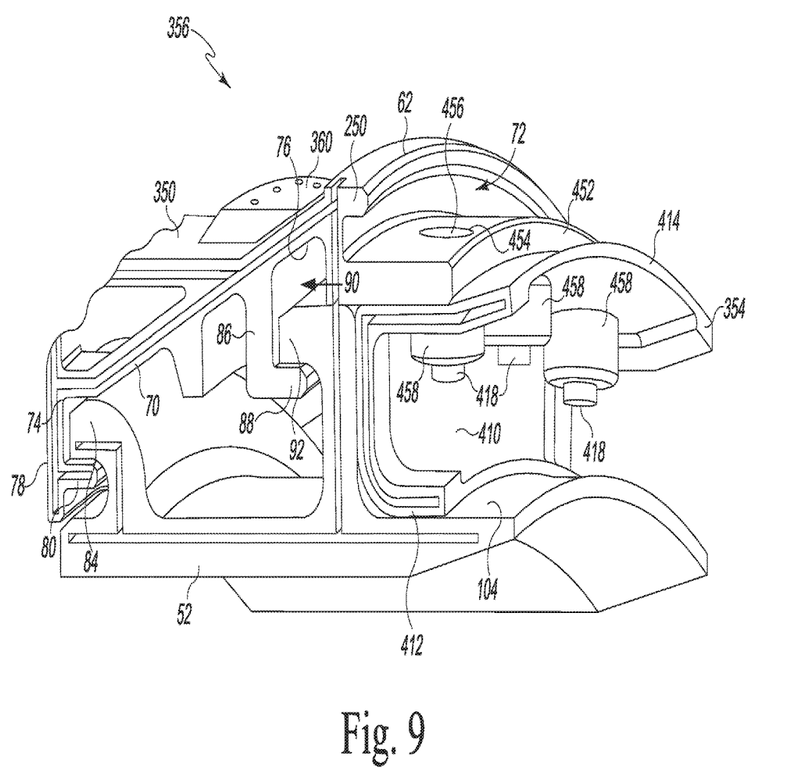
FIG. 9 is a rear perspective view of another embodiment of a turbine shroud segment for use in the gas turbine engine of FIG. 1.

As shown in FIG. 9, the retainer segment 354 includes a body 410 that engages the rear surface 112 of the rear hanger 108 of the seal segment 52. The retainer segment 354 includes a lower strut 412 that is spaced apart from the radially outward surface 104 of the seal segment 52 and an upper strut 414 that engages the lower surface of the rail 452 of the carrier segment 350. A plurality of fasteners 418 are used to secure the retainer segment 54 to the carrier segment 50.

Each fastener 418 is configured to be received in the upper strut 414 of the retainer segment 354. In the illustrative embodiment, the upper strut 414 includes a plurality of through holes (not shown) sized to receive the fasteners 418. The lower rail 452 of the carrier segment 350 includes a plurality of through holes 454 that are aligned with the holes defined in the upper strut 414. The through holes 454 are threaded and configured to engage a threaded shaft 456 of each fastener 418. It should be appreciated that in other embodiments the holes defined in the upper strut 414 may also be threaded. In other embodiments, none of the holes may be threaded. In the illustrative embodiment, each fastener 418 is threaded into each through hole 454 until a head 458 of the fastener 418 engages the upper strut 414. In that way, the carrier segment 350 and the retainer segment 354 cooperate to prevent the seal segment 52 from translating axially when assembled in the turbine 10. Additionally, the engagement between the retainer body 410 and the seal segment 52 permits the retainer segment 354 to act as a backstop to counter bending loads directed at the rear hanger 108 of the seal segment 52.

In other embodiments, the retainer may take other forms. For example, the retainer may be formed as a single, full-loop retainer that engages all of the carrier segments and all of the seal segments of the turbine shroud. For example, the retainer may be installed axially and then rotated (i.e., "clocked") around to engage a number of tabs and/or slots. In other embodiments, the carrier segments may be omitted and the seal segments and retainer segments may engage the casing directly.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud, comprising:
   a carrier including a plurality of carrier segments arranged about a central axis,
   a seal ring having a track for a turbine blade defined therein, the seal ring including a plurality of seal ring segments arranged concentrically with the plurality of carrier segments, each seal ring segment being formed as one piece from a ceramic matrix composite material and engaged with a corresponding carrier segment at a first point along the central axis,
   a retainer secured to the carrier at a second point along the central axis such that the seal ring is secured between the carrier and the retainer,
   wherein the seal ring is devoid of openings or passageways for fasteners,
   wherein a first carrier segment includes a lip that extends in a first direction along the central axis and is received in a slot defined in the retainer, and a fastener secures the retainer to the first carrier segment.

2. The turbine shroud of claim 1, wherein:
   the first carrier segment includes a rail extending in the first direction, and
   a first seal ring segment includes a flange (i) extending in a second direction opposite the first direction, and (ii) engaged with the rail of the first carrier segment at the first point.

3. The turbine shroud of claim 2, wherein the rail is one of a number of rails and the flange is one of a number of flanges, each rail of the first carrier segment being engaged with a corresponding flange of the first seal ring segment.

4. The turbine shroud of claim 3, wherein the first carrier segment includes:

a wall extending along the central axis from a first end to a second end, a first support wall extending radially inward from the first end of the wall, the first support wall having one of the rails extending therefrom, and a second support wall extending radially inward from the second end of the wall, the second support wall having another rail extending therefrom.

5. The turbine shroud of claim 4, wherein the first seal ring segment includes:

an arcuate body, a first post extending radially outward from the arcuate body, the first post having one of the flanges extending therefrom, and a second post extending radially outward from the arcuate body, the second post having another flange extending therefrom.

6. The turbine shroud of claim 5, wherein the second post is positioned between the second support wall and the retainer.

7. The turbine shroud of claim 6, wherein the retainer includes:

a first body positioned adjacent the arcuate body of the first seal ring segment, a second body secured to the first carrier segment, and a third body extending between the first body and the second body.

8. The turbine shroud of claim 7, wherein the fastener is a key received in a keyway defined in the first carrier segment and a groove defined in the second body of the retainer.

9. A component of a turbine, comprising:

a carrier segment having a rail, a seal ring segment including (i) a hanger having a flange supported on the rail of the carrier segment, and (ii) an inner surface having a section of a track for a turbine blade defined therein, and a retainer segment secured to the carrier segment such that the hanger is secured between the retainer segment and the carrier segment, wherein the seal ring segment is devoid of fasteners, further comprising a fastener extending through the retainer segment and the carrier segment.

10. The component of claim 9, wherein:

(i) the rail of the carrier segment is a first rail, (ii) the hanger of the seal ring segment is a first hanger, and (iii) the retainer segment is positioned on a first side of the first hanger, the seal ring segment includes a second hanger that is spaced apart from the first hanger and is positioned on a second side of the first hanger, and the carrier segment includes a second rail that supports a flange of the second hanger.

11. The component of claim 10, wherein:

a third rail includes a lip that is received in a slot defined in the retainer segment, and the fastener is a key received in a keyway defined in the carrier segment and a groove defined in the retainer segment.

12. The component of claim 9, wherein the seal ring segment is formed as one piece from a ceramic matrix composite material.

13. The component of claim 9, wherein the seal ring segment includes a body and the hanger includes a post that extends outwardly from the body to an outer tip, and the flange extends from the outer tip of the post.

14. A method of assembling a component of a turbine, the method comprising:

advancing a seal ring segment forward to engage a hanger of the seal ring segment with a rail of a carrier segment, positioning a retainer aft the hanger of the seal ring segment, and securing the retainer to the carrier segment, via a fastener extending through the carrier segment into a bottom surface of a groove in the retainer such that the hanger is secured between the carrier segment and the retainer.

15. The method of claim 14, wherein advancing the seal ring segment forward includes:

engaging a first hanger of the seal ring segment with a first rail of the carrier segment, and engaging a second hanger of the seal ring segment with a second rail of the carrier segment, the first hanger being positioned forward of the second hanger.

* * * * *